(12) United States Patent
Matikainen

(10) Patent No.: US 11,255,511 B2
(45) Date of Patent: Feb. 22, 2022

(54) OPTICAL DEVICE FOR MODIFYING LIGHT DISTRIBUTION

(71) Applicant: LEDIL OY, Salo (FI)

(72) Inventor: Yrjö-Sakari Matikainen, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 16/977,564

(22) PCT Filed: Nov. 1, 2018

(86) PCT No.: PCT/FI2018/050796
§ 371 (c)(1),
(2) Date: Sep. 2, 2020

(87) PCT Pub. No.: WO2019/170956
PCT Pub. Date: Sep. 12, 2019

(65) Prior Publication Data
US 2021/0003266 A1 Jan. 7, 2021

(30) Foreign Application Priority Data
Mar. 7, 2018 (FI) .................................. 20185212

(51) Int. Cl.
*F21V 5/04* (2006.01)
*B29D 11/00* (2006.01)
(Continued)

(52) U.S. Cl.
CPC .......... *F21V 5/045* (2013.01); *B29D 11/0048* (2013.01); *C03B 19/02* (2013.01);
(Continued)

(58) Field of Classification Search
CPC ............ G02B 19/0028; G02B 19/0071; F21V 7/0091; F21V 13/04; F21V 5/002; F21V 5/045
See application file for complete search history.

(56) References Cited

U.S. PATENT DOCUMENTS

| 1,399,973 | A | 12/1921 | Limpert |
| 4,069,812 | A | 1/1978 | O'Neill |

(Continued)

FOREIGN PATENT DOCUMENTS

| CN | 103742863 | 4/2014 |
| DE | 3427 461 | 2/1985 |

(Continued)

OTHER PUBLICATIONS

International Search Report for PCT/FI2018/050796 dated Feb. 1, 2019, 3 pages.

(Continued)

*Primary Examiner* — Rajarshi Chakraborty
*Assistant Examiner* — Michael Chiang
(74) *Attorney, Agent, or Firm* — Nixon & Vanderhye

(57) ABSTRACT

An optical device includes a center section having a lens portion for modifying distribution of a first part of light emitted by a light source, and a peripheral section surrounding the center section and including a conical surface for modifying distribution of a second part of the light emitted by the light source. The conical surface includes ridges where total internal reflection takes place when a light beam arrives from the light source at one of side surfaces of each ridge, and surface penetration takes place when the reflected light beam arrives at the other side surface of the ridge under consideration. Thus, the conical surface acts both as a reflective surface and as a refractive surface for achieving a desired light distribution pattern.

20 Claims, 3 Drawing Sheets

(51) Int. Cl.
  *C03B 19/02* (2006.01)
  *G02B 19/00* (2006.01)
  *F21Y 115/10* (2016.01)
  *F21V 7/00* (2006.01)

(52) U.S. Cl.
  CPC .......... *F21V 5/046* (2013.01); *G02B 19/0028* (2013.01); *F21V 7/0091* (2013.01); *F21Y 2115/10* (2016.08)

(56) References Cited

U.S. PATENT DOCUMENTS

| | | | | |
|---|---|---|---|---|
| 8,094,393 | B2* | 1/2012 | Minano | G02B 5/09 |
| | | | | 359/834 |
| 8,979,328 | B2* | 3/2015 | Wang He | F21V 13/04 |
| | | | | 362/337 |
| 9,640,741 | B1* | 5/2017 | Lin | F21V 5/04 |
| 10,502,392 | B2* | 12/2019 | Schwalenberg | F21V 13/045 |
| 2008/0013322 | A1 | 1/2008 | Ohkawa | |
| 2014/0085905 | A1* | 3/2014 | Broughton | F21V 7/0091 |
| | | | | 362/310 |
| 2016/0230954 | A1 | 8/2016 | Ha et al. | |
| 2017/0246767 | A1 | 8/2017 | Hukkanen | |
| 2018/0074232 | A1* | 3/2018 | Dross | F21V 7/0091 |
| 2019/0360664 | A1* | 11/2019 | Liu | F21K 9/68 |
| 2020/0232624 | A1* | 7/2020 | Lotfi | G02B 1/14 |

FOREIGN PATENT DOCUMENTS

| | | |
|---|---|---|
| DE | 10 2010 060 228 | 5/2012 |
| DE | 10 2014 217 093 | 3/2016 |
| GB | 2 015 144 | 9/1979 |
| WO | 2016/156339 | 10/2016 |
| WO | 2017/032493 | 3/2017 |
| WO | 2017/072406 | 5/2017 |

OTHER PUBLICATIONS

Written Opinion of the ISA for PCT/FI2018/050796 dated Feb. 1, 2019, 5 pages.

Finnish Search Report for FI 20185212 dated Oct. 1, 2018, 2 pages.

\* cited by examiner

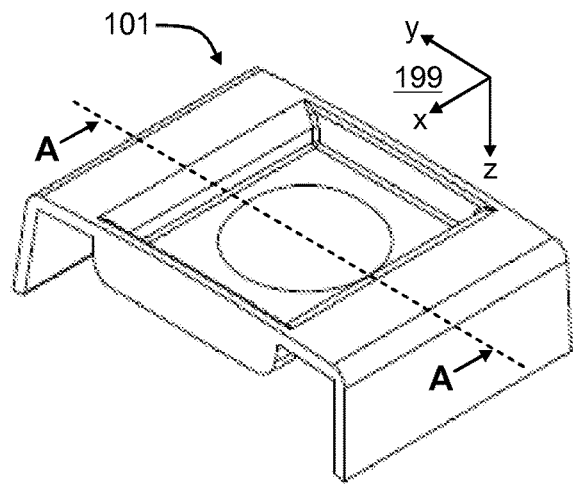
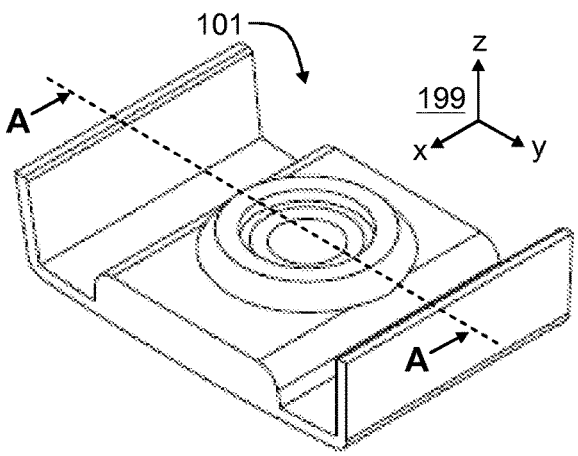
Figure 1a
Prior art
Figure 1b
Prior art
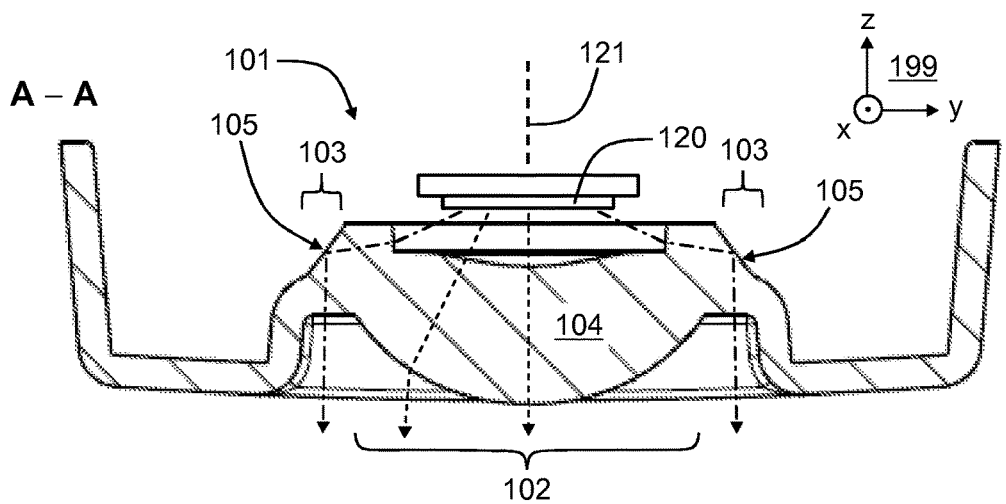
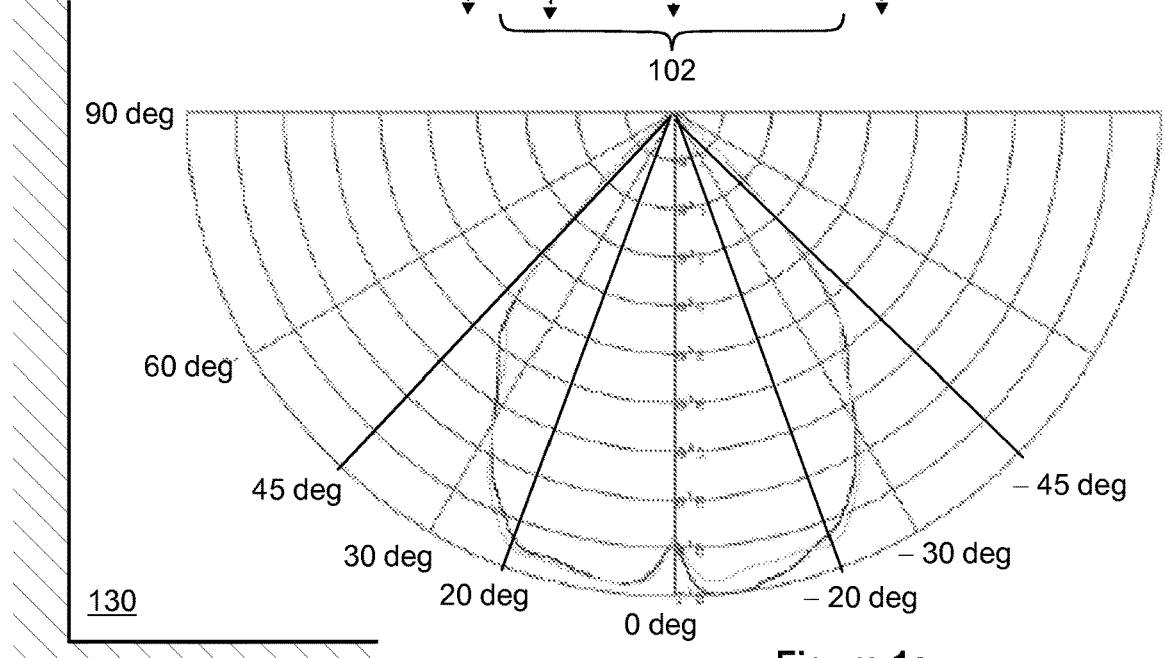
Figure 1c
Prior art

OPTICAL DEVICE FOR MODIFYING LIGHT DISTRIBUTION

This application is the U.S. national phase of International Application No. PCT/FI2018/050796 filed Nov. 1, 2018 which designated the U.S. and claims priority to FI Patent Application No. 20185212 filed Mar. 7, 2018, the entire contents of each of which are hereby incorporated by reference.

FIELD OF THE DISCLOSURE

The disclosure relates generally to illumination engineering. More particularly, the disclosure relates to an optical device for modifying distribution of light produced by a light source that may comprise, for example but not necessarily, one or more light emitting diodes "LED".

BACKGROUND

Distribution of light produced by a light source can be important or even critical in some applications. The light source may comprise, for example but not necessarily, one or more light emitting diodes "LED", one or more filament lamps, or one or more gas-discharge lamps. The distribution of light produced by a light source can be modified with optical devices such as lenses, reflectors, and combined lens-reflector devices that comprise sections which act as lenses and sections which act as reflectors. FIGS. 1a and 1b show isometric views of an exemplifying optical device 101 according to the prior art for modifying light distribution. The optical device 101 is made of suitable transparent material whose refractive index is greater than one. FIG. 1c shows a view of a section taken along a line A-A shown in FIGS. 1a and 1b. The section plane is parallel with the yz-plane of a coordinate system 199. Furthermore, FIG. 1c shows a polar-plot illustrating a light distribution pattern produced by a light source 120 and the optical device 101. In the exemplifying situation shown in FIGS. 1a-1c, the geometric optical axis 121 of the optical device 101 is parallel with the z-axis of the coordinate system 199. The optical device 101 comprises a center section 102 that comprises a lens portion 104 for modifying the distribution of a first part of the light emitted by the light source 120. The optical device 101 comprises a peripheral section 103 surrounding the center section 102 and comprising a conical surface 105. The conical surface 105 acts as a reflector surface so that total internal reflection "TIR" takes place when a light beam arrives from the light source 120 at a conical surface 105. In FIG. 1c, exemplifying light beams belonging to the first part of the light are depicted with arrow-headed dashed lines and exemplifying light beams belonging to the second part of the light are depicted with arrow-headed dash-and-dot lines.

As illustrated by the polar-plot shown in FIG. 1c, the intensity of light decreases rapidly when an absolute value of an angle with respect to the geometric optical axis 121 of the optical device 101 exceeds about 20 degrees. As a corollary, areas such as a corner area 130 illustrated in FIG. 1c may remain insufficiently illuminated when the optical device 101 is mounted on a ceiling. It is possible to spread the light distribution pattern by increasing the cone angle of the conical surface 105 and by shaping the lens portion 104 to be less collimating. However, in many cases there is a need to keep the whole light distribution pattern within desired limits. For example, the light distribution pattern illustrated by the polar-plot shown in FIG. 1c is between about −45 and +45 degrees with respect to the geometric optical axis 121 of the optical device 101. Thus, in many cases, there is a need to increase the intensity of light in fringe areas of the light distribution pattern.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying distribution of light produced by a light source.

An optical device according to the invention is made of transparent material and the optical device comprises:
  a center section comprising a lens portion for modifying distribution of a first part of light emitted by a light source when the light source is located symmetrically with respect to the geometric optical axis of the optical device, and
  a peripheral section surrounding the center section and comprising a conical surface for modifying distribution of a second part of the light emitted by the light source.

The conical surface comprises ridges in which total internal reflection "TIR" takes place when a light beam arrives from the light source at one of side surfaces of each ridge, and surface penetration takes place when the reflected light beam arrives at the other one of the side surfaces of the ridge under consideration. Thus, the conical surface acts both as a reflective surface and as a refractive surface for achieving a desired light distribution pattern so that, when compared to the light distribution pattern shown in FIG. 1c, more light can be directed to the fringe areas of the light distribution pattern. The conical surface intersects a geometric plane perpendicular to the geometric optical axis along a closed path having a cogged shape.

In this document, the wording "conical surface" is not limited to cases where geometric section curves between the conical surface and geometric planes perpendicular to the above-mentioned geometric optical axis are circles. In an optical device according to the invention, the geometric section curves have a non-circular shape.

In accordance with the invention, there is provided also a new illumination device that comprises:
  a light source, and
  an optical device according to the invention for modifying the distribution of light emitted by the light source, the light source being located symmetrically with respect to the geometric optical axis of the optical device.

The light source may comprise, for example, one or more light emitting diodes "LED".

In accordance with the invention, there is provided also a new mold having a form suitable for manufacturing, by mold casting, a piece of transparent material, e.g. plastic, having a shape of an optical device according to the invention.

Various exemplifying and non-limiting embodiments of the invention are described in accompanied dependent claims.

Exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIGS. 1a, 1b, and 1c illustrate an optical device according to the prior art for modifying light distribution, and FIGS. 2a, 2b, 2c, and 2d illustrate an optical device according to an exemplifying and non-limiting embodiment of the invention.

FIGS. 1a-1c have already been explained in the Background-section of this document.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2C:
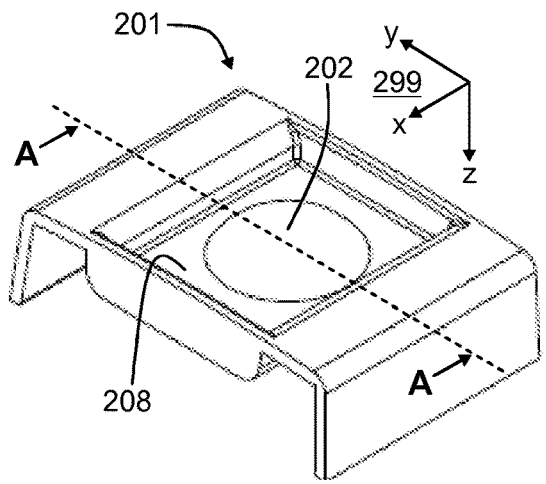
Figure 2C:
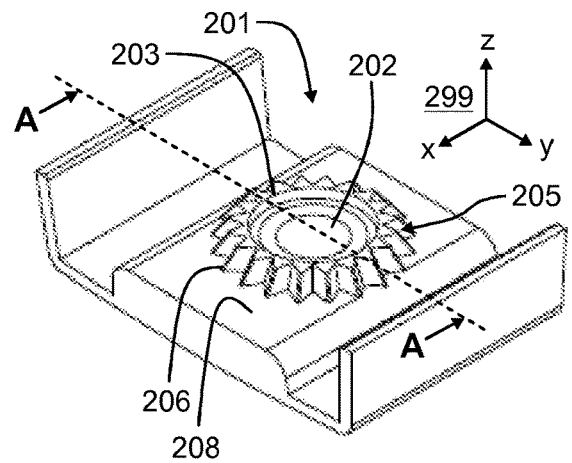
Figure 2C:
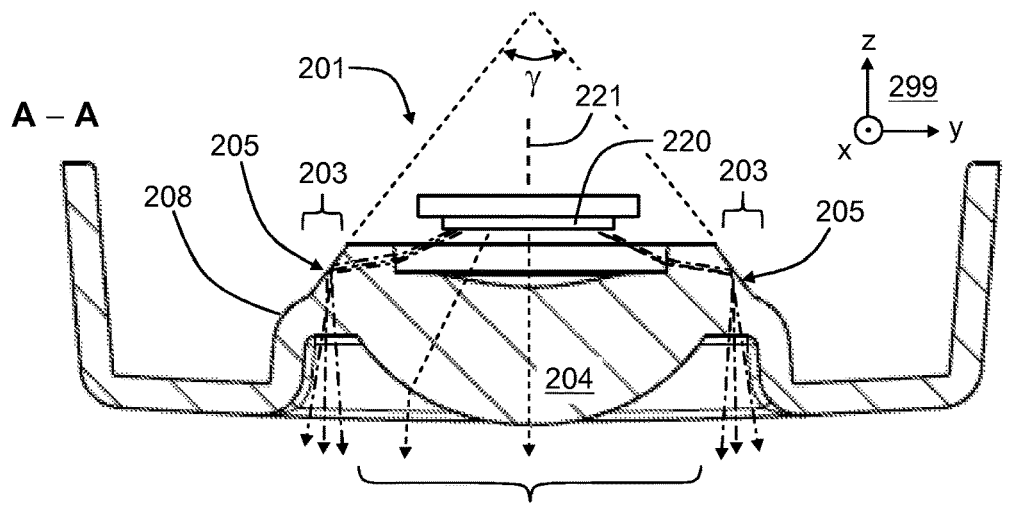
Figure 2C:
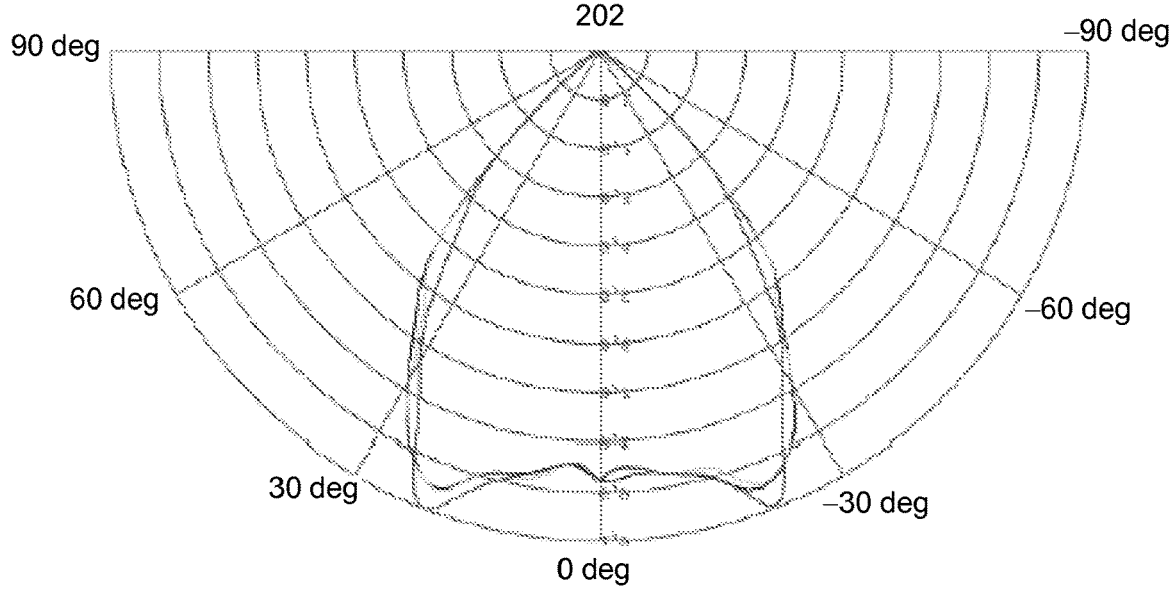

FIGS. 2a and 2b show isometric views of an optical device 201 according to an exemplifying and non-limiting embodiment of the invention. FIG. 2c shows a view of a section taken along a line A-A shown in FIGS. 2a and 2b. The section plane is parallel with the yz-plane of a coordinate system 299. Furthermore, FIG. 2c shows a polar-plot illustrating a light distribution pattern produced by a light source 220 and the optical device 201. The light source 220 may comprise for example one or more light emitting diodes "LED", one or more filament lamps, or one or more gas-discharge lamps. In the exemplifying situation shown in FIGS. 2a-2c, the geometric optical axis 221 of the optical device 201 is parallel with the z-axis of the coordinate system 299. The optical device 201 is made of transparent material whose refractive index is greater than one. The transparent material can be for example acrylic plastic, polycarbonate, optical silicone, or glass. The method of manufacture of the optical device 201 can be for example mold casting.

The optical device 201 comprises a center section 202 that comprises a lens portion 204 for modifying the distribution of a first part of the light emitted by the light source 220. In this exemplifying case, a light egress surface of the lens portion 204 is convex and a light ingress surface of the lens portion 204 comprises a concave center part and a flat part surrounding the concave center part. The optical device 201 comprises a peripheral section 203 surrounding the center section 202 and comprising a conical surface 205 for modifying distribution of a second part of the light emitted by the light source. In FIG. 2c, exemplifying light beams belonging to the first part of the light are depicted with arrow-headed dashed lines and exemplifying light beams belonging to the second part of the light are depicted with arrow-headed dash-and-dot lines. The optical device 201 and the light source 220 constitute an illumination device according to an exemplifying and non-limiting embodiment of the invention. The light source 220 is mechanically supported so that the light source 220 is located substantially symmetrically with respect to the geometric optical axis 221 of the optical device. Mechanical support structures for supporting the light source 220 are not shown in FIG. 2c.

Figure 2D:
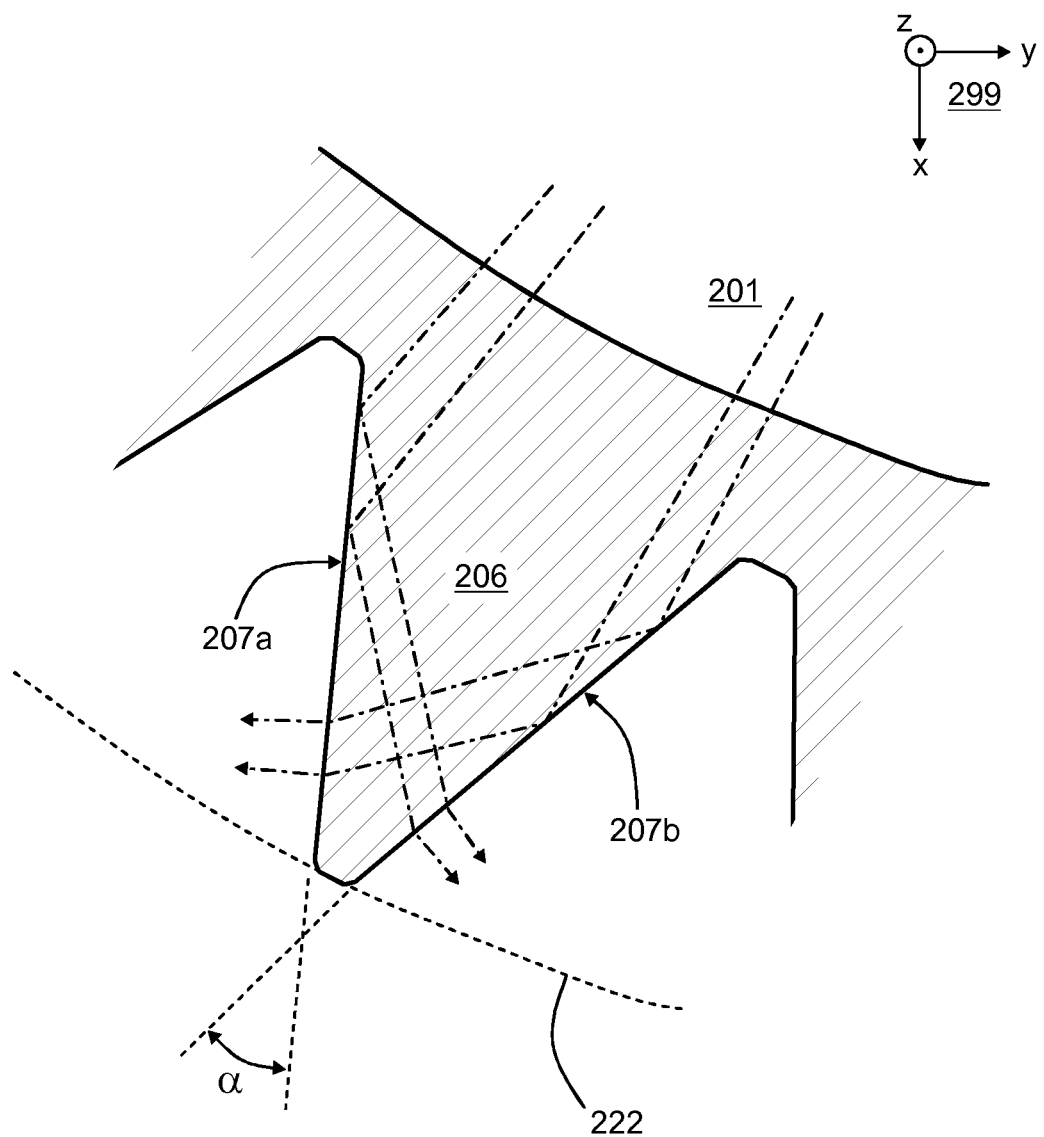

As illustrated in FIG. 2b, the above-mentioned conical surface 205 comprises ridges. In FIG. 2b, one of the ridges is denoted with a reference 206. The ridges are oriented so that the ridges are perpendicular to the circumferential direction of the conical surface. FIG. 2d shows a section view of the ridge 206 so that the section plane is parallel with the xy-plane of the coordinate system 299. As illustrated in FIG. 2d, the ridge 206 is shaped so that total internal reflection "TIR" takes place when a light beam arrives from the light source at one of side surfaces 207a and 207b of the ridge 206, and surface penetration takes place when the reflected light beam arrives at the other one of the side surfaces. Thus, the conical surface 205 having the ridges acts both as a reflective surface and as a refractive surface for achieving the light distribution pattern shown by the polar-plot of FIG. 2c. By comparing the polar-plot of FIG. 2c to the polar-plot of FIG. 1c, one can see that the light distribution pattern obtained with the optical device 201 according to the embodiment of the invention and the light distribution pattern obtained with the optical device 101 according to the prior art are both between about −45 and +45 degrees with respect to the geometric optical axis, but the optical device 201 according to the embodiment of the invention directs more light to the fringe areas of the light distribution pattern.

In the exemplifying optical device 201 illustrated in FIGS. 2a-2d, the center section 202 is substantially rotationally symmetric with respect to the geometric optical axis 221 and tops of the ridges of the conical surface 205 touch, as tangents, to a geometric conical surface substantially rotationally symmetric with respect to the geometric optical axis 221. A dashed line 222 in FIG. 2d represents a part of a geometric section curve between the above-mentioned geometric conical surface and the section plane related to FIG. 2d. The section plane is parallel with the xy-plane of the coordinate system 299. The cone angle of the above-mentioned geometric conical surface can be for example in the range from 30 degrees to 90 degrees. In FIG. 2c, the cone angle is denoted as y. It is, however, also possible that an optical device according to an embodiment of the invention has an elongated shape so that the optical device is suitable for an elongated light source such as e.g. a fluorescent tube.

In the exemplifying optical device 201 illustrated in FIGS. 2a-2d, the cross-sections of the ridges are substantially V-shaped as illustrated in FIG. 2d. The angle $\alpha$ between the side surfaces of each ridge is advantageously in the range from 55 degrees to 70 degrees, e.g. about 60 degrees, so as to achieve the functionality where a light beam arriving from the light source is reflected by total internal reflection on a side surface of a ridge and the reflected light beam penetrates the other side surface of the ridge. It is, however, also possible that an optical device according to an embodiment of the invention has ridges with curved, i.e. non-planar, side surfaces.

The exemplifying optical device 201 illustrated in FIGS. 2a-2d comprises a flange section 208 for mechanically supporting the center section 202 and the peripheral section 203. As shown in FIG. 2c, the flange section 208 is, in the direction of the geometric optical axis 221, between the conical surface 205 and a light egress surface of the lens portion 204. It is worth noting that the flange section 208 is a mechanical support structure and different mechanical support structures are possible in optical devices according to different embodiments of the invention. For example, instead of the flange section 208 shown in FIGS. 2a-2c, there can be isthmuses for supporting the center section 202 and the peripheral section 203. For another example, an optical device according to an embodiment of the invention may comprise a mechanical support section connected to the light ingress-side of the lens portion.

In an optical device according to an exemplifying and non-limiting embodiment of the invention, the light ingress surface of the lens portion 204 is a color mixing surface so that it comprises converging and diverging portions located alternately with respect each other. In a color mixing surface, light beams exhibiting different wavelengths are effectively mixed thus producing a light pattern which contains all wavelengths evenly distributed across the pattern. Thus, the color mixing surface mixes light beams representing different colors, i.e. different wavelengths, resulting from possible nonidealities of a light source.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying light distribution, the optical device being made of transparent material, the optical device comprising:
   a center section comprising a lens portion configured to modify distribution of a first part of light emitted by a light source when the light source is located symmetrically with respect to a geometric optical axis of the optical device; and
   a peripheral section surrounding the center section, the peripheral section comprising a conical surface configured to modify distribution of a second part of the light emitted by the light source, the conical surface comprising ridges in which total internal reflection takes place when a light beam arrives, from the light source, at one of side surfaces of each of the ridges, and surface penetration takes place when the reflected light beam arrives at another one of the side surfaces of the respective ridge, the conical surface intersecting a geometric plane perpendicular to the geometric optical axis of the optical device along a closed path having a cogged shape, a cone angle of the conical surface opening in a light exit direction of the lens portion.

2. The optical device according to claim 1, wherein the center section is substantially rotationally symmetric with respect to the geometric optical axis, and tops of the ridges touch, as tangents, to a geometric conical surface substantially rotationally symmetric with respect to the geometric optical axis.

3. The optical device according to claim 2, wherein a cone angle of the geometric conical surface is in a range from 30 degrees to 90 degrees.

4. The optical device according to claim 3, wherein cross-sections of the ridges are substantially V-shaped.

5. The optical device according to claim 3, further comprising a flange section configured to mechanically support the center section and the peripheral section, the flange section being, in a direction of the geometric optical axis, between the conical surface and a light egress surface of the lens portion.

6. The optical device according to claim 3, wherein a light egress surface of the lens portion is convex.

7. The optical device according to claim 2, wherein cross-sections of the ridges are substantially V-shaped.

8. The optical device according to claim 2, further comprising a flange section configured to mechanically support the center section and the peripheral section, the flange section being, in a direction of the geometric optical axis, between the conical surface and a light egress surface of the lens portion.

9. The optical device according to claim 2, wherein a light egress surface of the lens portion is convex.

10. The optical device according to claim 1, wherein cross-sections of the ridges are substantially V-shaped.

11. The optical device according to claim 10, wherein an angle between the side surfaces of each of the ridges is in a range from 55 degrees to 70 degrees.

12. The optical device according to claim 11, further comprising a flange section configured to mechanically support the center section and the peripheral section, the flange section being, in a direction of the geometric optical axis, between the conical surface and a light egress surface of the lens portion.

13. The optical device according to claim 10, further comprising a flange section configured to mechanically support the center section and the peripheral section, the flange section being, in a direction of the geometric optical axis, between the conical surface and a light egress surface of the lens portion.

14. The optical device according to claim 10, wherein a light egress surface of the lens portion is convex.

15. The optical device according to claim 1, further comprising a flange section configured to mechanically support the center section and the peripheral section, the flange section being, in a direction of the geometric optical axis, between the conical surface and a light egress surface of the lens portion.

16. The optical device according to claim 15, wherein the light egress surface of the lens portion is convex.

17. The optical device according to claim 1, wherein a light egress surface of the lens portion is convex.

18. The optical device according to claim 1, wherein the transparent material is one of the following: acrylic plastic, polycarbonate, optical silicone, and glass.

19. An illumination device comprising:
    a light source; and
    an optical device configured to modify a distribution of light emitted by the light source, the light source being located symmetrically with respect to a geometric optical axis of the optical device, the optical device being made of transparent material, the optical device comprising
      a center section comprising a lens portion configured to modify distribution of a first part of the light emitted by the light source, and
      a peripheral section surrounding the center section, the peripheral section comprising a conical surface configured to modify distribution of a second part of the light emitted by the light source, the conical surface comprising ridges in which total internal reflection takes place when a light beam arrives, from the light source, at one of side surfaces of each of the ridges, and surface penetration takes place when the reflected light beam arrives at another one of the side surfaces of the respective ridge, the conical surface intersecting a geometric plane perpendicular to the geometric optical axis of the optical device along a closed path having a cogged shape, a cone angle of the conical surface opening in a light exit direction of the lens portion.

20. A mold having a form configured to manufacture, by mold casting, a transparent piece constituting an optical device comprising:
a center section comprising a lens portion configured to modify distribution of a first part of light emitted by a light source when the light source is located symmetrically with respect to a geometric optical axis of the optical device; and
a peripheral section surrounding the center section, the peripheral section comprising a conical surface configured to modify distribution of a second part of the light emitted by the light source, the conical surface comprising ridges in which total internal reflection takes place when a light beam arrives, from the light source, at one of side surfaces of each of the ridges, and surface penetration takes place when the reflected light beam arrives at another one of the side surfaces of the respective ridge, the conical surface intersecting a geometric plane perpendicular to the geometric optical axis of the optical device along a closed path having a cogged shape, a cone angle of the conical surface opening in a light exit direction of the lens portion.

* * * * *